United States Patent
Robertson et al.

(10) Patent No.: US 8,446,412 B2
(45) Date of Patent: May 21, 2013

(54) STATIC VISUALIZATION OF MULTIPLE-DIMENSION DATA TRENDS

(75) Inventors: George G. Robertson, Seattle, WA (US); Roland Fernandez, Woodinville, WA (US); Danyel Fisher, Seattle, WA (US); Bongshin Lee, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 12/146,483

(22) Filed: Jun. 26, 2008

(65) Prior Publication Data

US 2009/0322754 A1    Dec. 31, 2009

(51) Int. Cl.
*G06T 15/00*    (2011.01)
*G06T 11/20*    (2006.01)

(52) U.S. Cl.
USPC ............................. 345/440; 345/419; 345/418

(58) Field of Classification Search
USPC .......... 345/418, 419, 440, 618, 619; 600/523; 715/784
See application file for complete search history.

(56) References Cited

U.S. PATENT DOCUMENTS

| | | | |
|---|---|---|---|
| 5,767,854 A | 6/1998 | Anwar | |
| 6,839,719 B2 | 1/2005 | Wallace | |
| 7,158,992 B2 | 1/2007 | Megiddo et al. | |
| 7,205,991 B2 | 4/2007 | Fitzmaurice et al. | |
| 7,224,362 B2 * | 5/2007 | Kincaid et al. | 345/440 |
| 7,320,001 B1 | 1/2008 | Chen | |
| 7,609,257 B2 * | 10/2009 | Wright et al. | 345/419 |
| 2002/0091319 A1 * | 7/2002 | Moehring et al. | 600/454 |
| 2006/0238538 A1 | 10/2006 | Kapler et al. | |
| 2006/0259509 A1 * | 11/2006 | Stolte et al. | 707/102 |
| 2007/0055782 A1 | 3/2007 | Wright et al. | |
| 2007/0188494 A1 | 8/2007 | Agutter et al. | |
| 2007/0211056 A1 | 9/2007 | Chakraborty et al. | |
| 2007/0216683 A1 * | 9/2007 | Navratil et al. | 345/440 |

FOREIGN PATENT DOCUMENTS

JP    11045276 A  *  2/1999

OTHER PUBLICATIONS

Wei Peng, "Clutter-Based Dimension Reordering in Multi-Dimensional Data Visualization", Thesis submitted, Jan. 2005, 92 pages.
"Dynamic Enterprise Dashboards", http://www.microstrategy8.com/dynamicdashboards_demo.asp?CID=.
Matange, et al., "Multidimensional Data Visualization Tools", Information Visualization, (Retrieved Feb. 26, 2008) 14 pages.
Stephen G. Eick, "Visualizing Multi-Dimensional Data", Computer Graphics, Feb. 2000, 7 pages.

(Continued)

*Primary Examiner* — Ulka Chauhan
*Assistant Examiner* — Sultana M Zalalee

(57) ABSTRACT

A data trends static visualization system and method including a data trends static visualization diagram for statically visualizing changes in data. The data trends static visualization diagram is a multi-dimensional static diagram including plots of multiple data items, where each data item is a set of related data having associated nodes and links. Each node represents a data point of the data item and links are used to connect at least some of the nodes. The data trends static visualization diagram uses a variety of visualization components to accentuate data changes and indicate a direction (or flow) of data trends. The visualization components include a node opacity visualization component, a link opacity visualization component, and a node size visualization component. The data trends static visualization diagram includes a traces diagram, for plotting trace lines in one diagram, and a small multiples diagram, for plotting individual trace lines in multiple diagrams.

13 Claims, 8 Drawing Sheets

OTHER PUBLICATIONS

Baecker, et al., "Animation at the Interface", The Art of Human-Computer Interface Design, 1990, 32 pages.

Lyn Bartram, "Enhancing Visualizations with Motion", In Hot Topics: Information Visualization 1998, May 1998, 5 pages.

Baudisch, et al., "Phosphor: Explaining Transitions in the User Interface Using Afterglow Effects", Proceedings of the 19th annual ACM symposium on User interface software and technology, Oct. 15-18, 2006, pp. 169-178.

Bederson, et al., "Does Animation Help Users Build Mental Maps of Spatial Information?", In Proc. IEEE InfoVis 1999, San Francisco, CA, Oct. 1999, pp. 28-35.

"Gapminder", http://www.gapminder.org.

Griffin, et al., "A Comparison of Animated Maps with Static Small-Multiple Maps for Visually Identifying Space-Time Clusters", Annals of the Association of American Geographers, vol. 96, Issue 4, 2006, pp. 740-753.

Heer, et al., "Animated Transitions in Statistical Data Graphics", IEEE Transactions on Visualization and Computer Graphics, vol. 13, No. 6, Nov./Dec. 2007, pp. 1240-1247.

Kehoe, et al., "Rethinking the Evaluation of Algorithm Animations as Learning Aids: An Observational Study", Int. J. Human-Computer Studies, 2001, vol. 54, pp. 265-284.

"MicroStrategy Animated Bubble Chart", http://www.microstrategy8.com/DashboardGallery/Dashboards/AnimatedBubble.html.

"Report Portal Moving Bubble Chart", http://www.reportportal.com/Flash/Bubble/Bubble.html.

Robertson, et al., "Animated Visualization of Multiple Intersecting Hierarchies", Journal of Information Visualization, vol. 1, No. 1, Mar. 2002, pp. 1-23.

"TED 2006", http://www.gapminder.org/video/talks/ted-2006-debunking-myth-about-the-third-world.html.

"TED 2007", http://www.gapminder.org/video/talks/ted-2007-the-seemingly-impossible-is-possible.html.

Tversky, et al., "Animation: Can It Facilitate? " Int. J. Human-Computer Studies, 2002, vol. 57, pp. 247-262.

Zongker, et al., "On Creating Animated Presentations", Eurographics/SIGGRAPH Symposium on Computer Animation (2003), 12 pages.

Robertson, et al., "Cone Trees: Animated 3D Visualizations of Hierarchical Information", In Proc. ACM CHI 1991, New Orleans, LA, Apr. 1991, pp. 189-194.

Bianchi, et al., "A comparison of methods for trend estimation", Applied Economics Letters, 1999 , 6, pp. 103-109.

Cleveland, et al., "Graphical Perception and Graphical Methods for Analyzing Scientific Data", Science, New Series, vol. 229, No. 4716 (Aug. 30, 1985), pp. 828-833. Published by American Association for the Advancement of Science.

* cited by examiner

STATIC VISUALIZATION OF MULTIPLE-DIMENSION DATA TRENDS

BACKGROUND

The use of animation in diagrams has recently gained prominence for visualizing trends in multi-dimensional data during presentations. In general, the word "trend" means to have a general tendency, such that a trend in data is an observed general tendency of the data. One common way to visualize trends in data is to plot a variable's change over time on a line chart (or bar chart). If there is a general increase or decrease over time, this is perceived as a trend up or down. On the other hand, if there is a general increase or decrease that reverses direction, it is perceived as a reversing trend. If there are more than a few reversals, it appears to be cyclic or noisy data, and no trend is perceived.

Several types of animation techniques are currently available for visualizing data trends using diagrams. In one technique, the use of animation together with interesting data and a highly engaging presenter provide a dramatic impact. This animation technique uses animation to illustrate trends in multi-dimensional data. This technique uses an animated (or dynamic) bubble chart to show three dimensions of data, one for the X-axis, one for the Y-axis, and one for the bubble size, animated over changes in a fourth dimension (time). For example, when looking at United Nations statistics for various countries, the X-axis might show life expectancy, the Y-axis might show infant mortality rate, and the bubble size might show population size, with each bubble representing a country. The trend over time is shown as an animation over time, with the bubbles changing position and size to indicate the current data values for each country at a particular time. For example, the animation may show a general trend for most countries to increase life expectancy while decreasing infant mortality rate.

This technique is quite effective in a presentation setting. The presenter already knows the direction of the data trend flow and directs the observer's attention to an area of interest in the diagram. Once the observer knows where to look, the animation makes the data come to life and emphasizes the critical results of an analysis. This has been done with large screens and has evoked a strong favorable response from audiences.

During analysis or data exploration, however, there is no presenter telling the user of the diagram where to look. In practice, this means the user, in most cases, must replay the animation several times to process trend developments in the animated diagram and identify the direction of data trend flow and any anomalies in the trends. Consequently, this animation technique is much less effective for analysis and data exploration situations. Without a presenter directing the user's attention, the user will notice changes but not know exactly where to look in the diagram without repeatedly viewing the diagram.

At least one other animation technique adds the ability to collapse related bubbles into an aggregate bubble (such as, in the example above, to show one bubble for a continent). This aggregation animation technique reduces clutter and occlusion, but anomalies of interest are potentially hidden from view. Another technique uses a moving bubble chart, which adds the ability to identify which dimensions of a data cube to map to which axes. These animated techniques, however, still work best in a data presentation setting as compared to a data analysis setting.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the data trends static visualization system and method include a data trends static visualization diagram to statically display and visualize change over time of data. This data trends static visualization diagram uses a variety of visualization components to accentuate the data changes and indicate a direction of flow of data trends. Using these visualization components, the data trends static visualization diagram presents clearly to a user in an analysis setting the data trends and data anomalies for quick and easy data analysis.

The data trends static visualization diagram is a multi-dimensional static diagram that has plots of multi-variable data. The data includes multiple data items, where each data item is a set of related data. Each data item also has associated with it nodes and links. Each node represents a data point of the data item, and links are used to connect at least some of the nodes of a data item to each other. Typically, the starting node (or the node that is earliest in time) of a data item and the ending node (or the node that is last in time) of a data item have only one link connecting them. In this manner, data for each data item can be plotted on the diagram 160.

The visualization components of the data trends static visualization system and method include a node opacity visualization component, a link opacity visualization component, and a node size visualization component. The node opacity visualization component varies opacity of nodes in a data item. This means that a starting node (or first data point in time) of a data item is nearly transparent (or lacks most opacity), while the ending node (or last data point in time) is approximately fully opaque. The varying opacity between the starting and the ending nodes provides a static indicator of a direction of flow of a trend of the data item.

The link opacity visualization component varies opacity of each link connecting two nodes. In particular, when a link connects two nodes and the first node is earlier in time as compared to the second node, then the opacity of the link will vary from nearly transparent near the first node to nearly opaque at the second node. This varying link opacity is a static visual indicator that the direction of flow of the data in time is from the first node to the second node, or earlier in time to later in time. The node size visualization component varies a size of each node of a data item. More specifically, when moving from a starting node to an ending node, the size of each node varies from a smallest size of the starting node, with each node gradually increasing in size until the ending node is reached. The ending node has the largest size of the nodes in that data item or on that trace line. The varying size (from smaller to larger) between a starting nodes and an ending node provides a static indicator of a direction of flow of a trend of the data item.

Embodiments of the data trends static visualization system and method also include two types of diagrams that use the above-mentioned visualization components. These diagrams are a traces diagram and a small multiples diagram. The traces diagram simultaneously plots multiple items of data having multiples variables. Each data item contains nodes and links that are plotted in the traces diagram in the form of trace lines. Each data item has a corresponding trace line. The traces diagram uses the visualization components, particularly the node opacity visualization component and the link opacity visualization component.

The small multiples diagram includes a plurality of smaller sub-diagrams. Each sub-diagram contains a plot of a trace line for a single data item, and each of the sub-diagrams share x, y, and size axes. The small multiples diagram uses the node size visualization component, and can also use the node opacity visualization component and the link opacity visualization component. The data trends static visualization system and method also includes an interaction component. This interaction component can be used in the traces diagram to highlight a selected trace line and de-emphasizes the non-selected trace lines to reduce clutter and emphasize the selected trace line for easier and quicker analysis.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the data trends static visualization system and method reference is made to the accompanying drawings, which form a part thereof, and in which is shown by way of illustration a specific example whereby embodiments of the data trends static visualization system and method may be practiced. It is to be understood that other embodiments may be utilized and structural changes may be made without departing from the scope of the claimed subject matter.

I. System Overview

Figure 1:
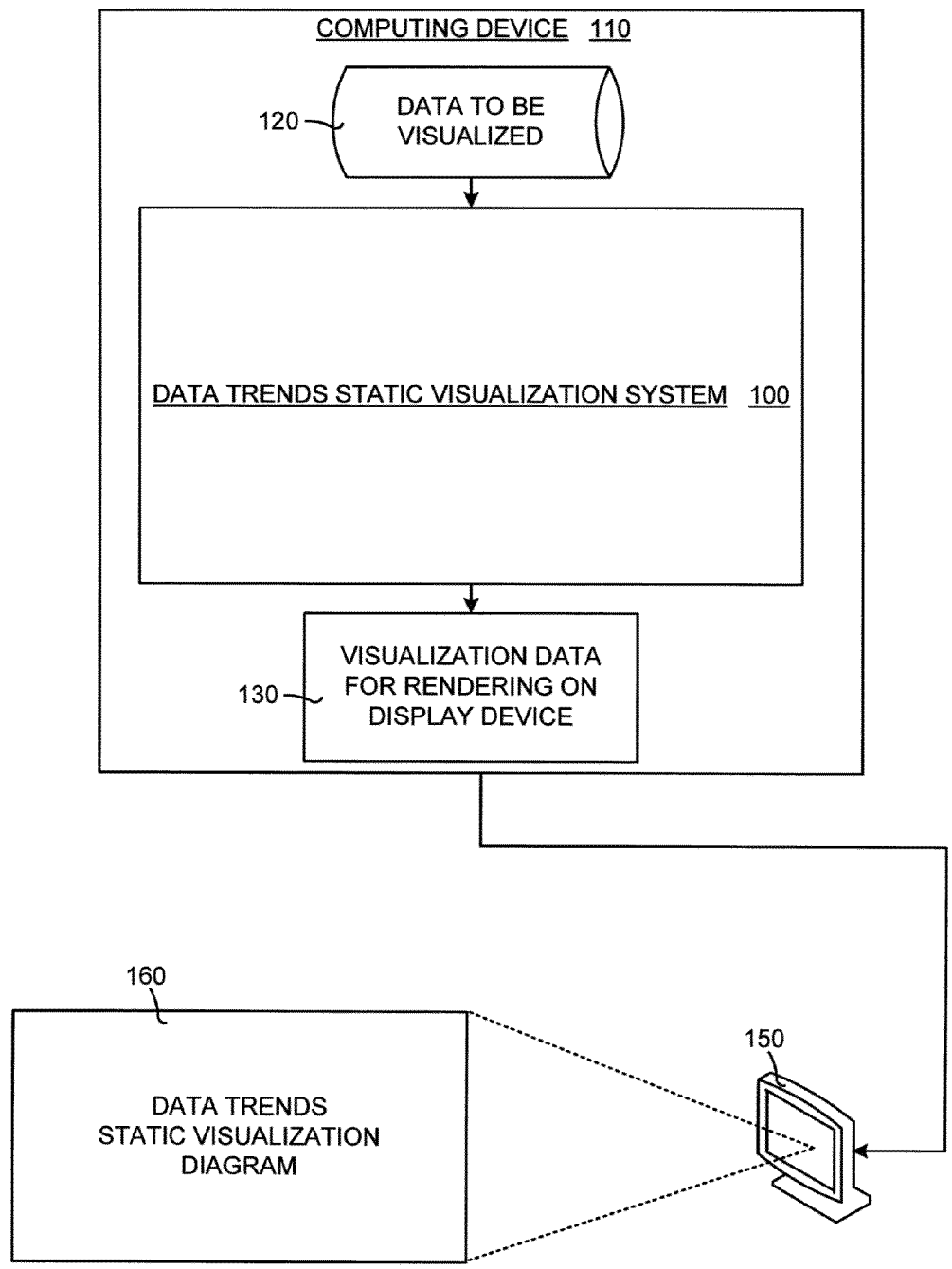
FIG. 1 is a block diagram illustrating a general overview of embodiments of the data trends static visualization system and method disclosed herein.

FIG. 1 is a block diagram illustrating a general overview of embodiments of the data trends static visualization system and method disclosed herein. It should be noted that the implementation shown in FIG. 1 is only one of many implementations that are possible. Referring to FIG. 1, a data trends static visualization system 100 is shown implemented on a computing device 110. It should be noted that the computing device 110 may include a single processor (such as a desktop or laptop computer) or several processors and computers connected to each other.

In general, embodiments of the data trends static visualization system 100 process and present data to a user in such as way as to allow the user to quickly visualize trends in data and recognize a direction of a data trends flow. By "direction of data trends flow", it is meant the direction in which the trend is going over time. The data trends static visualization system 100 facilitates the visualization of data trends in a static diagram, meaning that animation is not used.

The data trends static visualization system 100 inputs data to be visualized 120. This data may be stored data or streaming data. The data trends static visualization system 100 processes the incoming data to be visualized 120 and outputs visualization data for rendering on a display device 130. In communication with the computing device 110 is a display device 150 for displaying the rendered data. More specifically, a data trends static visualization diagram 160 is displayed on the display device 150 using a variety of visualization components, as described in detail below. The dashed lines from the data trends static visualization 160 to the display device 150 in FIG. 1 are meant to indicate that the data trends static visualization 160 has been rendered and is displayed on the display device 150.

Embodiments of the data trends static visualization diagram 160 include a multi-dimensional static diagram that has data plotted thereon. The data is multi-variable data, and the data includes multiple data items. By "data items", it is meant data that is related by a common thread. For example, if the diagram 160 plots infant mortality versus life expectancy for various countries, then one such "data item" would be the data for a certain country, say the United States of America. Moreover, another data item would be data for another country, say France, and so forth.

Each data item has associated with it nodes and links. Each node represents a data point of the data item plotted on the diagram 160. A link connects the nodes of the data item, such that each of the nodes of the data items has a link between the nodes, except for the beginning node and the ending node of the data item. The beginning node represents a first data point in time of the data item, while the ending node represents a last data point in time of the data item. In this manner, data for each data item can be plotted on the diagram 160.

Figure 2:
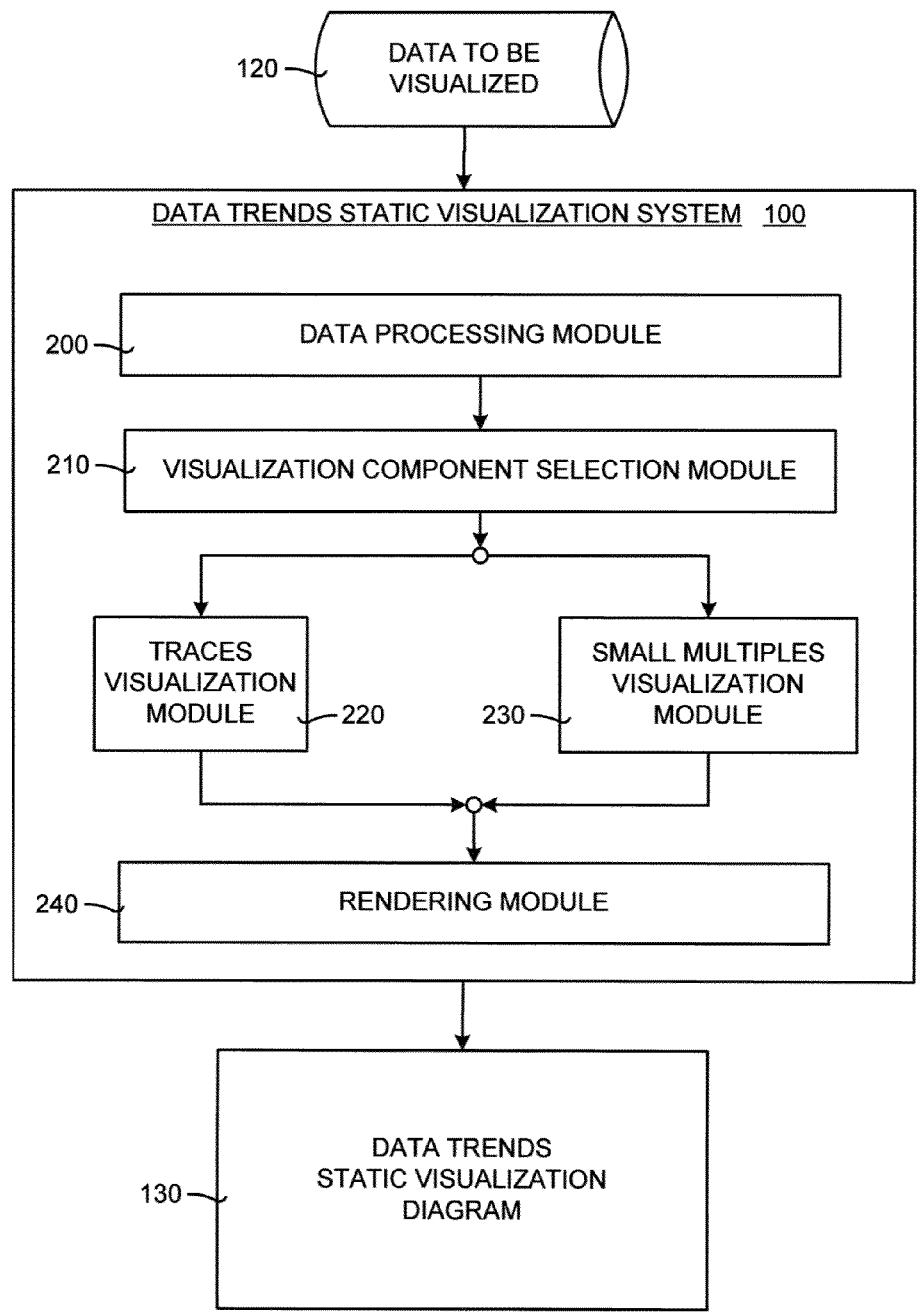
FIG. 2 is a block diagram illustrating details of embodiments of the data trends static visualization system and method shown in FIG. 1.

Embodiments of the data trends static visualization system 100 include a number of program modules and components. FIG. 2 is a block diagram illustrating details of embodiments of the data trends static visualization system 100 and method shown in FIG. 1. In general, FIG. 2 illustrates the program modules utilized by embodiments of the data trends static visualization system 100 to process the data to be visualized 120 to generate the data trends static visualization diagram 160.

Referring to FIG. 2, the data trends static visualization system 100 inputs the data to be visualized 120 and sends the data 120 to a data processing module 200 for processing. Next, a visualization component selection module 210 is used to select visualization components that will be used to visualize the processed data. The visualization components are described in detail below. Moreover, these visualization components may be select automatically by the system 100, by a user (not shown), or by a combination of both.

The data trends static visualization system 100 also includes a traces visualization module 220 and a small multiples visualization module 230. The traces visualization module 220 inputs the processed data and selected visualization components and generates a traces diagram. The small multiples visualization module 230 also inputs the processed data and the selected visualization components and generates a small multiples diagram. Both the traces diagram and the small multiples diagram are described in detail below. The output of the traces visualization module 220 and the small multiples visualization module 230 is sent to a rendering module 240. The rendering module renders the data for viewing on the display device 150. The data rendered is the data trends static visualization diagram 130, which includes a traces diagram, a small multiples diagram, or both.

II. System Details

The details of embodiments of the data trends static visualization system 100 and method now will be discussed. These embodiments include embodiments of the program modules and components shown in FIG. 2.

II.A. Visualization Components

The data trends static visualization system 100 and method contains a number of visualization components. These visualization components facilitate the visualization of data trends and direction of data trend flow in a static diagram. Using these visualization components, the data trends static visualization system 100 presents to a user a static diagram that allows the user to quickly understand in which direction the data is flowing and the general trends of the data. Visualization components include a node opacity visualization component, a link opacity visualization component, and a node size visualization component. Each of these components will now be discussed in detail.

Figure 3:
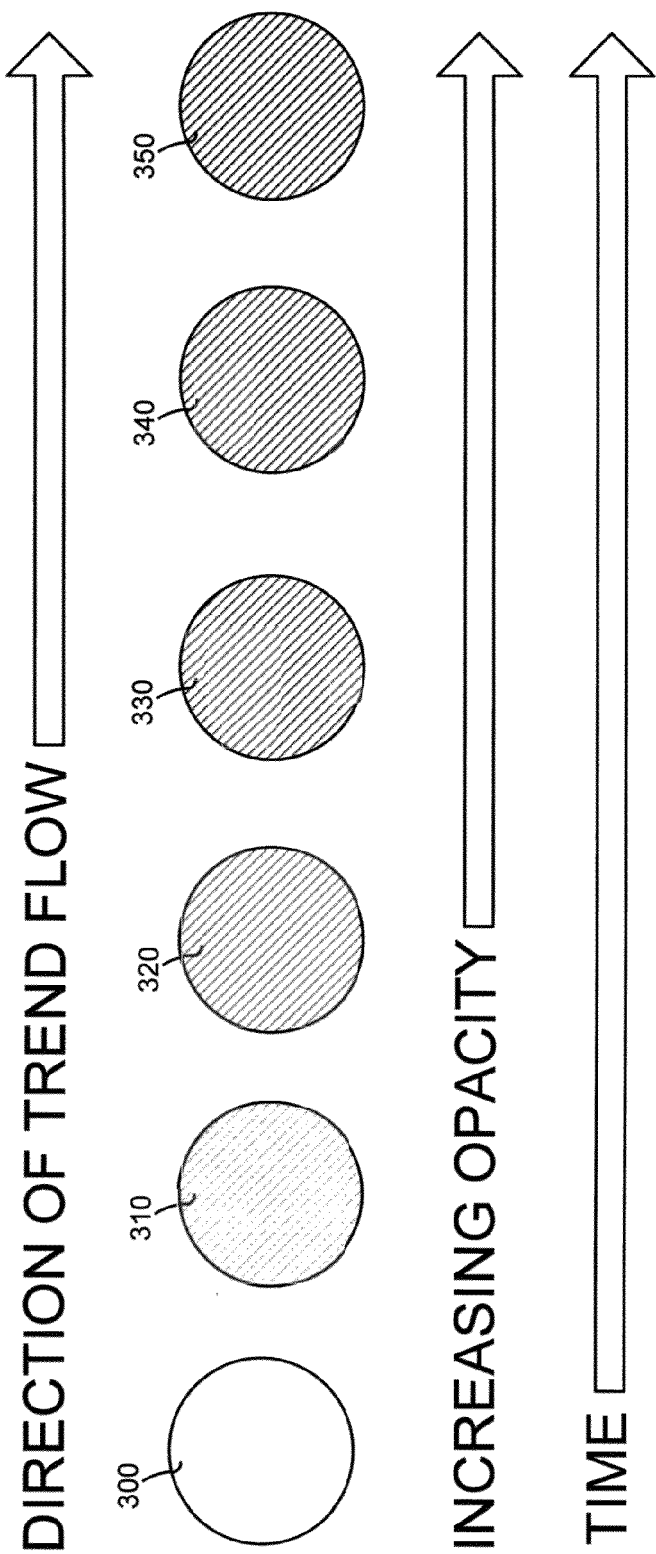
FIG. 3 is a block diagram illustrating the node opacity visualization component of the data trends static visualization system and method shown in FIGS. 1 and 2.

FIG. 3 is a block diagram illustrating node opacity visualization component of the data trends static visualization system 100 and method shown in FIGS. 1 and 2. In general, the node opacity visualization component varies opacity of nodes of a data item. More specifically, a node 300 is shown in FIG. 3 and represents a beginning node (or first data point in time) of a data item. This node 300 is nearly transparent (or lacks most opacity), as indicated by a lack of shading. It should be noted that in FIGS. 3-5 shading is directly proportional to opacity. In other words, less shading of a node or link indicates the less opacity of that node and more shading of a node or link indicates greater opacity of that node.

Going from left to right in FIG. 3, a node 310 is later in time than node 300, and this is indicated by a greater opacity (and thus greater shading) of node 310 as compared to node 300. This follows for the remainder of the nodes, namely, node 320 has greater opacity than node 310 (and is later in time), node 330 has greater opacity than node 320 (and is later in time), and node 340 has greater opacity than node 330 (and is later in time). Node 350 is an ending node of the data item, and thus has the greatest opacity as compare to the other nodes. Moreover, node 350 is the data point of the data item that is latest in time. As indicated in FIG. 3, the varying opacity between nodes 300 and 350 also provides a static indicator of a direction of flow of a trend of the data item.

Figure 4:
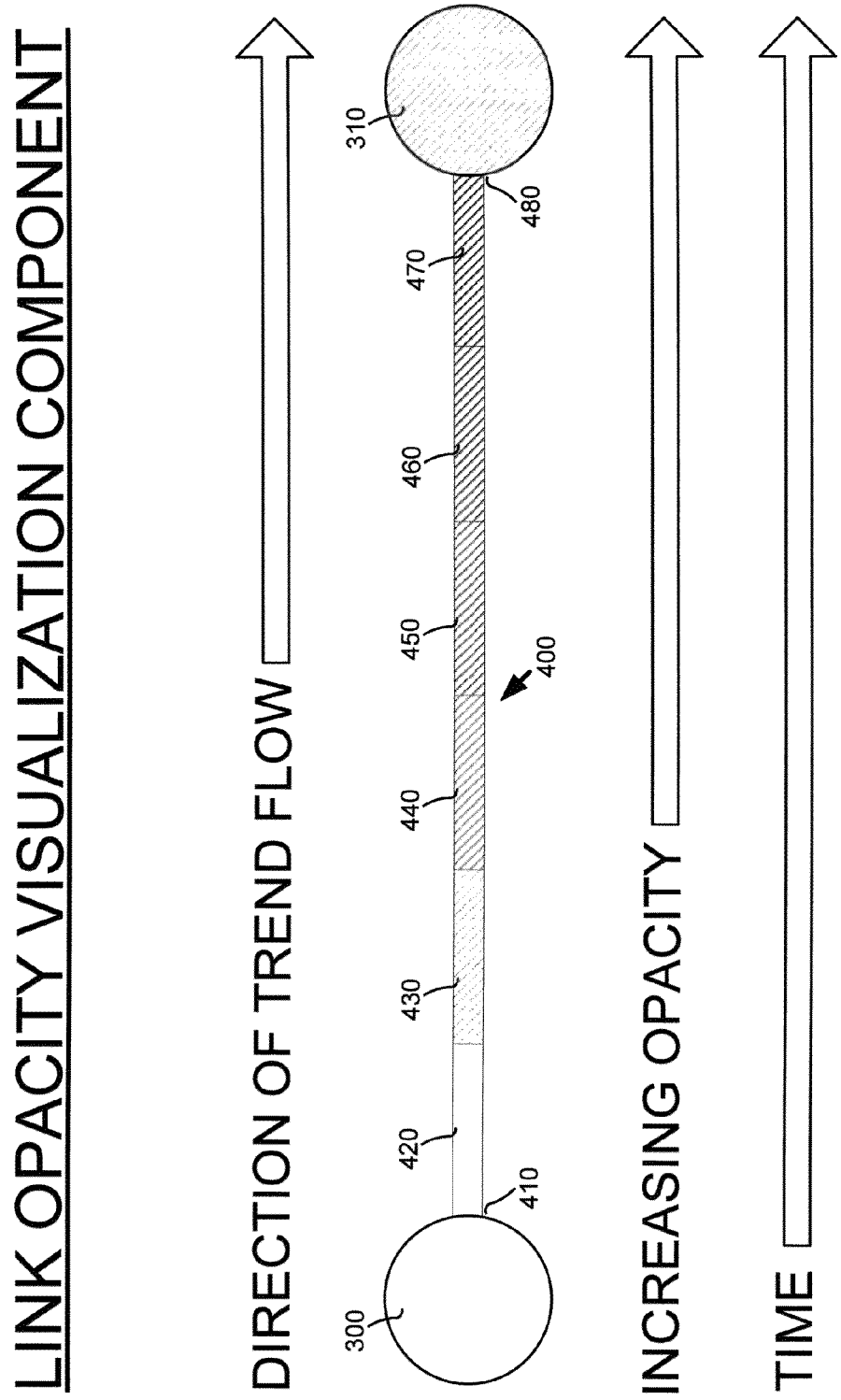
FIG. 4 is a block diagram illustrating the link opacity visualization component of the data trends static visualization system and method shown in FIGS. 1 and 2.

FIG. 4 is a block diagram illustrating the link opacity visualization component of the data trends static visualization system 100 and method shown in FIGS. 1 and 2. In general, the link opacity visualization component varies opacity of each link connecting two nodes. In particular, as shown in FIG. 4, a link 400 connects the node 300 and the node 310 (from FIG. 3).

Moving from left to right in FIG. 4, the node 300 (which is the earliest node in time of the data item) has a first link end 410 attached to it. A first link segment 420 is nearly transparent, as indicated by a lack of shading. A second link segment 430 has a greater degree of opacity as compared to the first link segment 420, as indicated by greater shading. Similarly, a third link segment 440 has a greater degree of opacity than the second link segment 430, as indicated by even more shading. A fourth link segment 450 has more opacity than the third link segment 440, the fifth link segment 460 has more opacity than the fourth link segment 450, and the sixth link segment 470 has more opacity than the fifth link segment 460, as indicated in FIG. 4 by increased shading at each of the link segments. A second link end 480 attaches the link to the node 310.

It can be seen that moving from left to right in FIG. 4 the opacity of the link 400 varies from nearly transparent (or lacks most opacity) at the first link end 410 to mostly opaque (nearly completely opaque) at the second link end 480. Moreover, it can be seen that the varying opacity in the link 400 provides a static indicator of a direction of flow of a trend of the data item. In other words, the varying opacity of the link 400 is a static visual indicator that the direction of flow of the data in time is from node 300 to node 310, or earlier in time to later in time. It should also be noted that in FIG. 4 link segments are shown to illustrate varying opacity such that the varying opacity is discrete. In actual practice, embodiments of the link opacity visualization component can also have the link 400 vary opacity smoothly from mostly transparent to mostly opaque when traversing along the link 400 from the first link end 410 to the second link end 480, using an opacity gradient.

Figure 5:
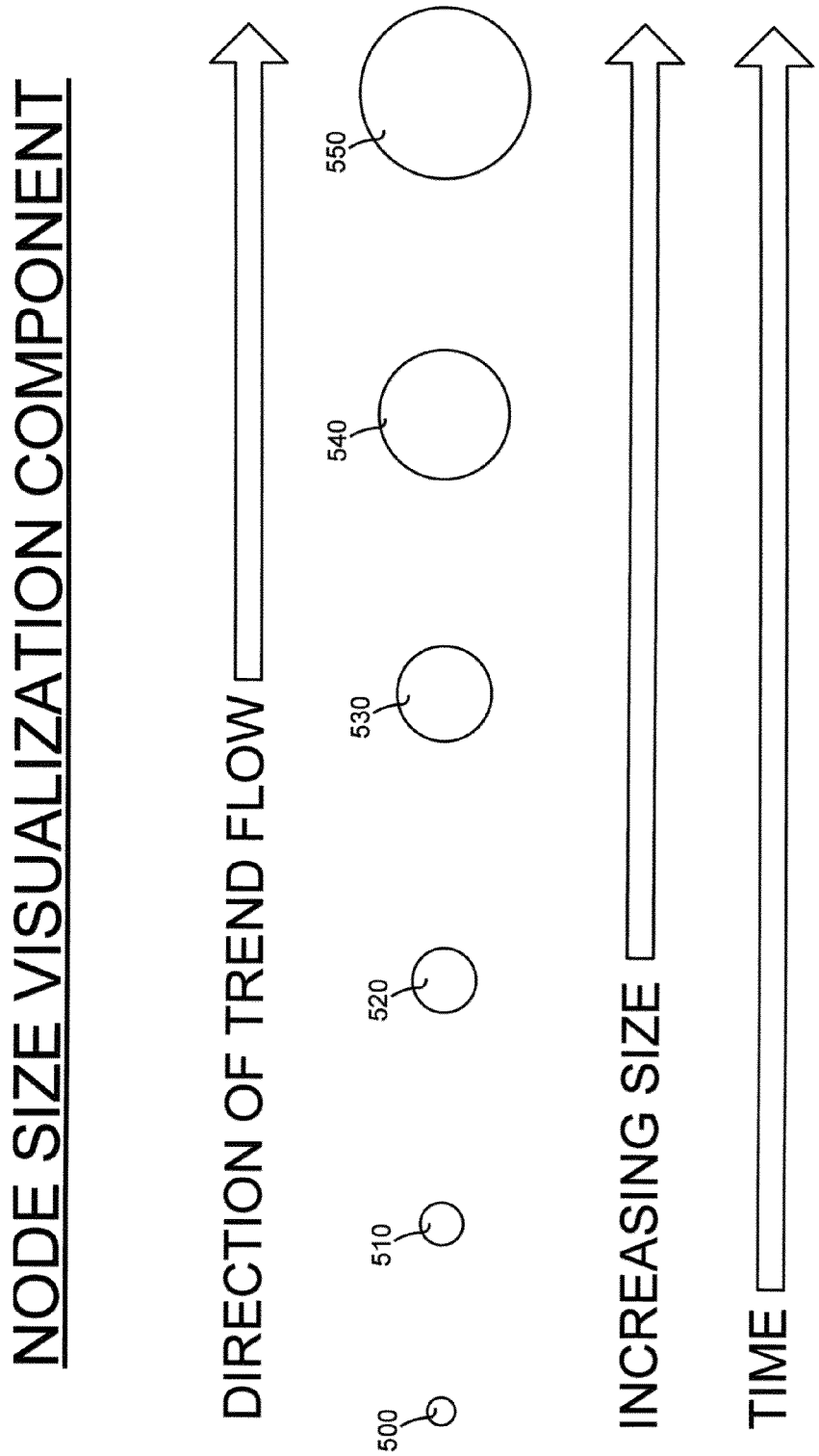
FIG. 5 is a block diagram illustrating the node size visualization component of the data trends static visualization system and method shown in FIGS. 1 and 2.

FIG. 5 is a block diagram illustrating the node size visualization component of the data trends static visualization system 100 and method shown in FIGS. 1 and 2. Generally, the node size visualization component varies a size of each node of a data item. It should be noted that the nodes in FIG. 5 are shown unshaded, meaning that the nodes are mostly transparent or have little opacity. However, alternate embodiments of the node size visualization module are possible.

Referring to FIG. 5, a node 500 is shown in FIG. 5 and represents a beginning node (or first data point in time) of a data item. This node 500 is the smallest in size of the other nodes shown in FIG. 5. Traversing from left to right in FIG. 5, a node 510 is later in time than node 500, and this is indicated by a greater size of node 510 as compared to node 500. Similarly, node 520 has greater size than node 510 (and is later in time), node 530 has greater size than node 520 (and is later in time), and node 540 has greater size than node 530 (and is later in time). Node 550 is an ending node of the data item, and thus has the greatest size as compare to each of the other nodes. Moreover, node 550 is the data point of the data item that is latest in time. As indicated in FIG. 5, the varying size (from smaller to larger) between nodes 500 and 550 provides a static indicator of a direction of flow of a trend of the data item. In this technique, the size of the last node (node 530) is determined by some other method (for example, it may represent population size of the country at the ending year). The earlier node sizes are computed after the ending node size is known.

II.B. Traces Visualization Diagram

Figure 6:
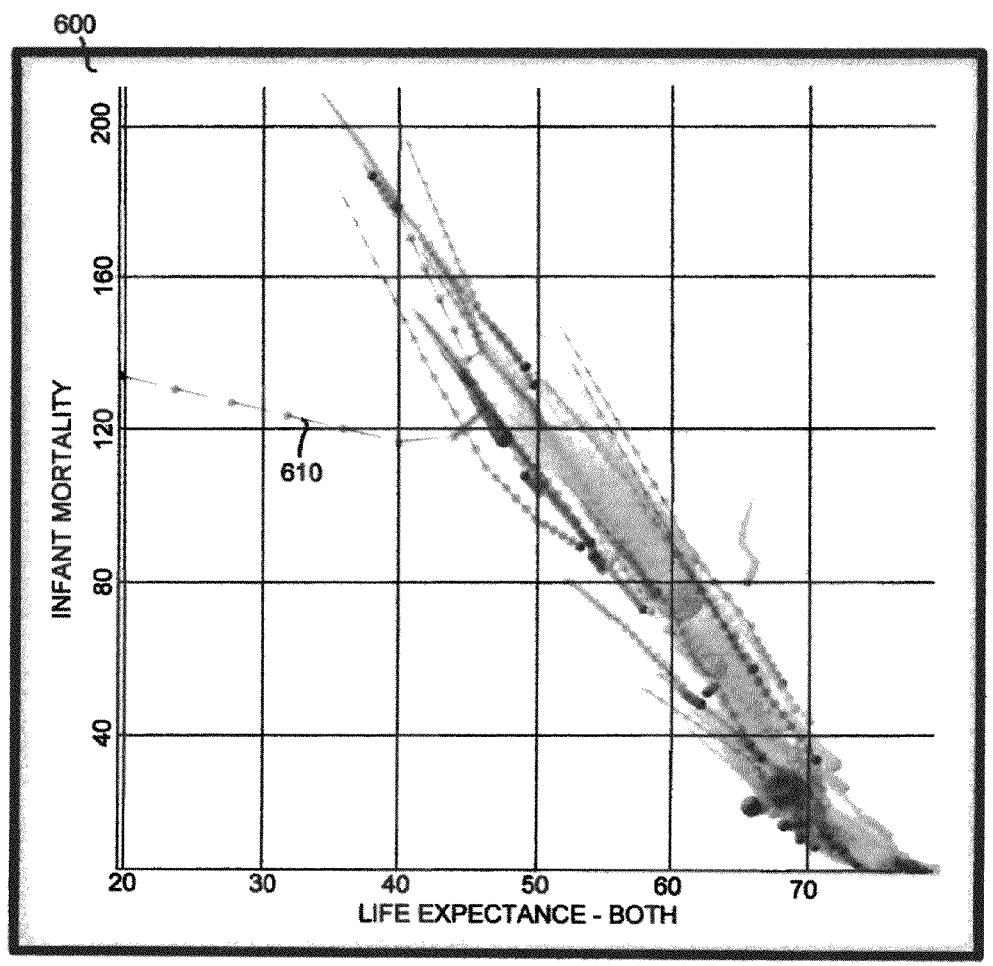
FIG. 6 is an exemplary example of a traces diagram of the data trends static visualization system and method shown in FIGS. 1-5.

The data trends static visualization system 100 and method include a traces visualization diagram for statically visualizing changes in data over time. FIG. 6 is an exemplary example of a traces diagram 600 of the data trends static visualization system and method shown in FIGS. 1-5. Referring to FIG. 6, the traces diagram plots Infant Mortality versus Life Expectance for various countries around the world. Moreover, in the traces diagram 600, the size of the nodes indicates the size of the country being represented.

The traces diagram 600 simultaneously illustrates each of the data items contained in data having multiples variables. In particular, the traces diagram 600 illustrates nodes every one of their x, y locations and sizes over all time. Nodes contained in the same data item then are connected using links. Connecting the nodes with links helps clarify the sequence of the nodes. The nodes and links of each data item are represented as trace lines, and every trace line for each data item is plotted or displayed in the traces diagram 600.

The traces diagram also uses visualization components. In particular, the node opacity visualization component and the link opacity visualization component are shown in FIG. 6. Node opacity is varied for each data item in FIG. 6 by fading from mostly transparent in the earliest node in time to mostly opaque in the latest node in time. Moreover, as illustrated in FIG. 6, each link connecting the nodes varies in opacity. This allows a user to perceive direction of flow even for smaller nodes.

Referring to FIG. 6, the data item 610 on the far left of the traces diagram 600 represents the country Rwanda, which has rapidly decreasing life expectancy. In addition, the traces diagram 600 renders larger nodes of the data item 610 first. This avoids occluding smaller nodes of the data item 610. Using the node opacity visualization component and the link opacity visualization component on the traces diagram, changes in time of the data and the direction of flow of the data trends may be statically presented visually to a user.

II.C. Small Multiples Visualization Diagram

One potential downside with the traces diagram 600 is that counter-trends that occur in the midst of many other trends may be lost in the clutter and be hard for a user to discern. Indeed, lines that have the same, or similar, data (even if offset in time) will be drawn over each other, as happened with many of the countries in the middle of FIG. 6. In addition, in the traces diagram 600, reversals may be occluded and it can be hard to tell if a point is retracing its steps.

Figure 7:
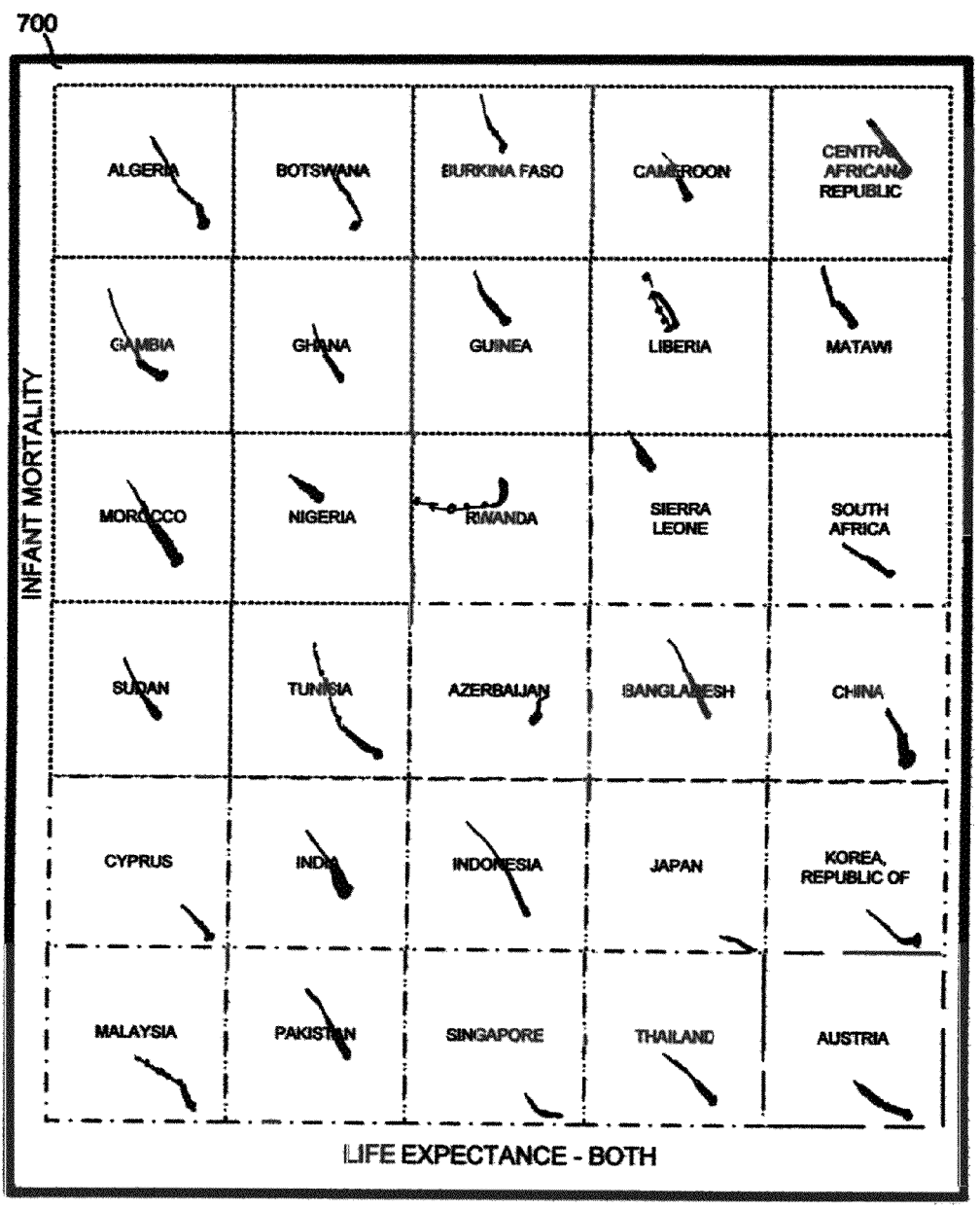
FIG. 7 is an exemplary example of a small multiples diagram of the data trends static visualization system and method shown in FIGS. 1-5.

The data trends static visualization system 100 also includes a small multiples diagram 700, shown in FIG. 7. One way to deal with clutter that occurs for both animation and in the traces diagram 600 is to use the small multiples diagram 700. FIG. 7 is an exemplary example of a small multiples diagram 700 of the data trends static visualization system 100 and method shown in FIGS. 1-5. The small multiples diagram 700 has a plurality of sub-diagrams, and each sub-diagram contains a plot of a trace line for a single data item. The data is the exact same data for the traces diagram 600 shown in FIG. 6.

Each of the sub-diagrams of the small multiples diagram 700 share x, y, and size axes. Moreover, in the example shown in FIG. 7, the sub-diagrams are further grouped by continent and ordered alphabetically within each group. In the small multiples diagram 700, visualization components are used to allow a user to discern in which direction the line is moving.

The small multiples diagram 700 uses a node size visualization component to show direction of flow. In FIG. 7, this component changes the encoding of node size to encode direction of flow of the trace line from smallest to largest node. The last and largest node for each country uses the original encoding of node size (for example, to encode country population size). As shown in FIG. 5 and explained above in relation to FIG. 5, the largest node in the trace line of a data item is the node that is latest in time, while the smallest node is the node that is the earliest in time.

Using the small multiples diagram 700 with a node size visualization component, anomalies in the data are easy for a user to identify. Moreover, the clutter is eliminated such that a user of the small multiples diagram 700 experiences relatively few errors, as compared to an animation technique or even the traces diagram 600. In alternate embodiments of the small multiples diagram 700, the node opacity visualization component and the link opacity visualization component can be used to indicate changes in the data over time and direction of data trend flow. However, these alternate embodiments typically work best when the number of data items is fewer such that the sub-diagrams of the small multiples diagram 700 typically are larger than when there are a multitude of sub-diagrams.

II.D. Interaction Component

The data trends static visualization system 100 also includes an interaction component that highlights a selected trace line of a data item and de-emphasizes the non-selected trace lines of data items. This eliminates clutter and accentuates the selected trace line for easier and quicker analysis. Typically, the interaction component is used in the traces diagram 600. The interaction component allows a user to select a particular trace line. The selected trace line then is highlighted by brightening or increasing the contrast of the nodes and links in that trace line. Moreover, the non-selected trace lines are grayed-out to decrease the contrast of the nodes and links of the non-selected trace lines. It should be noted that the following discussion only mentions a single trace line being selected. However, in alternate embodiments, more than one trace line may be selected by the user using the interaction component. However, it will be appreciated that the selection of too many trace lines can lessen the effectiveness of the interaction component.

III. Exemplary Operating Environment

Embodiments of the data trends static visualization system 100 and method are designed to operate in a computing environment. The following discussion is intended to provide a brief, general description of a suitable computing environment in which embodiments of the data trends static visualization system 100 and method may be implemented.

Figure 8:
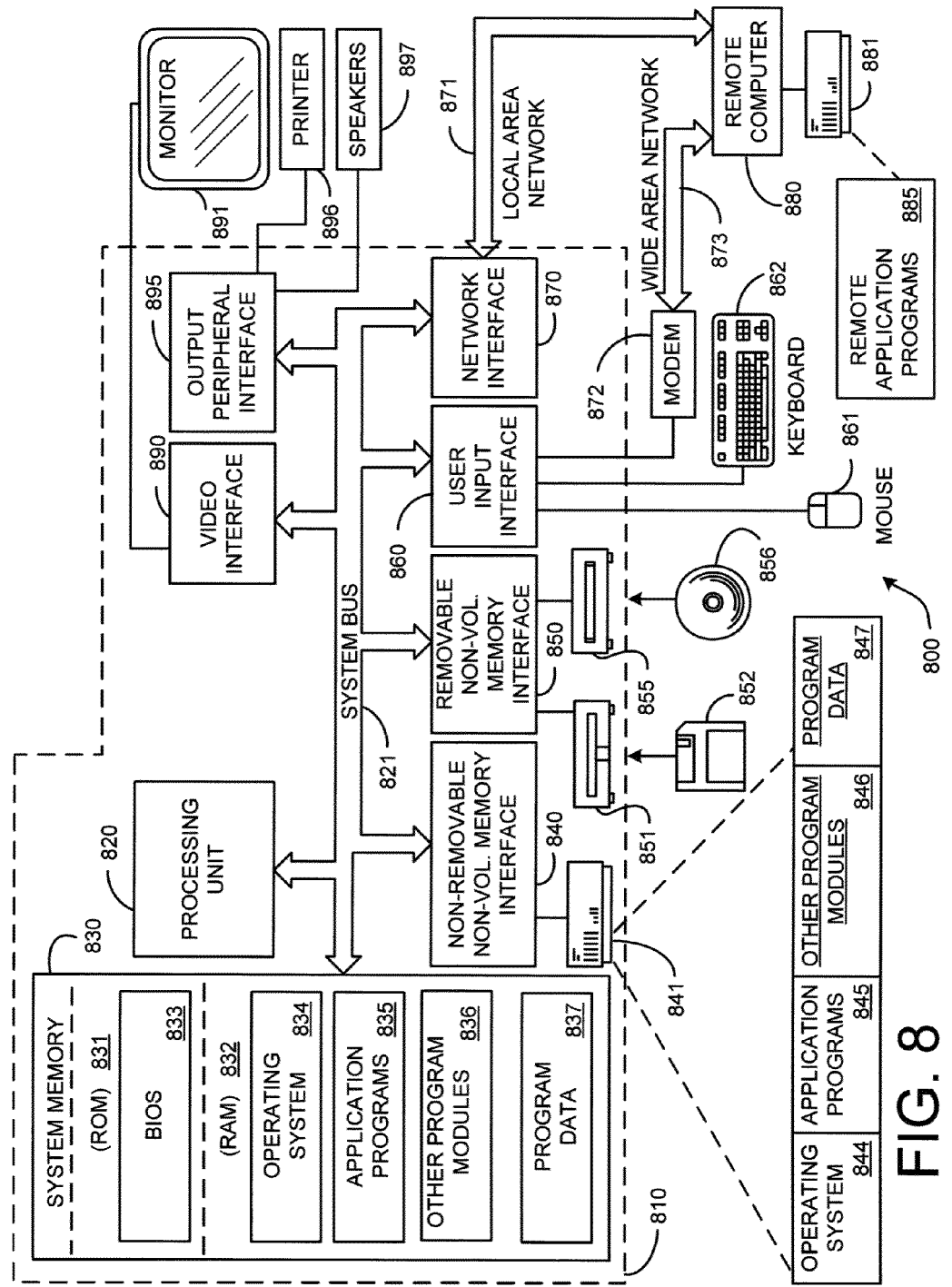
FIG. 8 illustrates an example of a suitable computing system environment in which embodiments of the data trends static visualization system and method shown in FIGS. 1-7 may be implemented.

FIG. 8 illustrates an example of a suitable computing system environment in which embodiments of the data trends static visualization system and method shown in FIGS. 1-7 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment.

Embodiments of the data trends static visualization system 100 and method are operational with numerous other general purpose or special purpose computing system environments or configurations. Examples of well known computing systems, environments, and/or configurations that may be suitable for use with embodiments of the data trends static visualization system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the data trends static visualization system 100 and method may be described in the general context of computer-executable instructions, such as program modules, being executed by a computer. Generally, program modules include routines, programs, objects, components, data structures, etc., that perform particular tasks or implement particular abstract data types. Embodiments of the data trends static visualization system 100 and method may also be practiced in distributed computing environments where tasks are performed by remote processing devices that are linked through a communications network. In a distributed computing environment, program modules may be located in both local and remote computer storage media including memory storage devices. With reference to FIG. 8, an exemplary system for data trends static visualization system 100 and method includes a general-purpose computing device in the form of a computer 810.

Components of the computer 810 may include, but are not limited to, a processing unit 820 (such as a central processing unit, CPU), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer readable media. Computer readable media can be any available media that can be accessed by the computer 810 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 810. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 840 includes computer storage media in the form of volatile and/or nonvolatile memory such as read only memory (ROM) 831 and random access memory (RAM) 832. A basic input/output system 833 (BIOS), containing the basic routines that help to transfer information between elements within the computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 871 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information (or data) into the computer 810 through input devices such as a keyboard 862, pointing device 861, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 820 through a user input interface 860 that is coupled to the system bus 821, but may be connected by other interface and bus structures, such as, for example, a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A data trends static visualization system, comprising:
   a computing device;
   a display device in communication with the computing device that displays:
   data containing data items having related data points that is plotted on a data trends static visualization diagram;
   nodes that represent data points of the data plotted on the data trends static visualization diagram;
   links that are used to connect related nodes of each of the data items;
   visualization components that statically vary visual properties of the nodes, the links, or both, to indicate changes over time of the data;
   an interaction component that highlights nodes and links of a selected data item and grays out nodes and links of remaining non-selected data items;
   a node size visualization component that first determines an ending node size of an ending node and then computes sizes of nodes earlier in time than the ending node, and then varies the sizes of the nodes earlier in time between a starting node having a smallest size and the ending node having a largest size, with each node gradually increasing in size from the starting node to the ending node to provide a static indicator of a direction over time of flow of a trend of the data items; and
   a node opacity visualization component that statically illustrates a direction over time of flow of a trend of a data item by varying opacity of the related nodes between a starting node and an ending node by going from nearly transparent and lacking most opacity at the starting node to approximately fully opaque at the ending node.

2. The data trends static visualization system of claim 1, further comprising visualization components that indicate the direction of flow of the trend of the data item.

3. The data trends static visualization system of claim 2, further comprising a traces diagram that visualizes traces lines for each of the data items in the data.

4. The data trends static visualization system of claim 3, further comprising a link opacity visualization component that statically illustrates changes over time of the data and indicates the direction of trend flow by varying opacity of links that connect related nodes of a data item.

5. The data trends static visualization system of claim 2, further comprising a small multiples diagram having multiple diagrams such that each of the multiple diagrams visualizes trace lines of a single corresponding data item.

6. A data trends static visualization system, comprising:
   a computing device;
   a display device in communication with the computing device that displays:
   a traces visualization diagram for statically visualizing a direction of flow of data trends in time;
   data containing multiples variables that are visualized on the traces visualization diagram;
   a plurality of data items contained in the data, each of the plurality of data items having associated data points corresponding to a data item;
   a plurality of nodes that represent data points and that are plotted on the traces visualization diagram such that each data item has a group of nodes associated with it;
   a plurality of links that connect nodes such that the group of nodes associated with each data item are connected by a group of links also associated with that data item;
   a visualization component visually indicates changes over time of the data by varying opacity properties the plurality of nodes and the plurality of links;
   trace lines that are plotted on the trace visualization diagram for each of the data items, the trace lines including for each data item its associated nodes and its associated links to display to a user on a display device of a computing device changes over time of trends in the data;
   an interaction component that allows a user to select at least one of the trace lines and then increase a contrast of nodes and links of a selected trace lines and decreases contrast of nodes and links of non-selected trace lines;
   a node size visualization component that first determines an ending node size of an ending node and then computes sizes of nodes earlier in time than the ending node, and then varies the sizes of the nodes earlier in time between a starting node having a smallest size and the ending node having a largest size, with each node gradually increasing in size from the starting node to the ending node to provide a static indicator of a direction over time of flow of a trend of the data items; and
   a node opacity visualization component that statically illustrates a direction over time of flow of a trend of a data item by varying opacity of nodes of a data item based on a node's position in time by going from nearly transparent and lacking most opacity at a starting node to approximately fully opaque at an ending node.

7. The data trends static visualization system of claim 6, further comprising the node opacity visualization component containing nodes of the data item that vary from less opacity for nodes of the data item earlier in time to more opacity for nodes of the data item later in time to statically illustrate changes over time of the data item and indicate a direction of trend flow of the data item.

8. The data trends static visualization system of claim 6, further comprising a link opacity visualization component that varies opacity of a link of a data item between two nodes of the data item.

9. The data trends static visualization system of claim 8, further comprising the link opacity visualization component containing each of the links corresponding to a data item such that each link varies in opacity between each of the nodes in the data item.

10. The data trends static visualization system of claim 9, further comprising the link opacity visualization component containing a link that varies from less opacity for a first end of the link attached to a first node representing data that is earlier in time to more opacity for a second end of the link attached to a second node representing data that is later in time to statically illustrate changes over time of the data item and indicate a direction of trend flow of the data item.

11. A data trends static visualization system, comprising:
a computing device;
a display device in communication with the computing device that displays:
a small multiples visualization diagram for statically visualizing changes over time of data containing multiple variables;
a plurality of data items contained in the data, each of the plurality of data items having associated data points corresponding to a data item;
a plurality of nodes that represent data points such that each data item has a group of nodes associated with it;
a plurality of links that connect nodes such that the group of nodes associated with each data item is connected by a group of links also associated with that data item;
a visualization component visually indicates changes over time of the data by varying opacity properties the plurality of nodes and the plurality of links;
a plurality of sub-diagrams such that each sub-diagram contains a trace line plotted therein for a single data item, the trace line containing associated nodes and associated links of the single data item to display to a user on a display device of a computing device changes over time of trends in the data;
an interaction component that allows a user to select at least one of the trace lines and then increase a contrast of nodes and links of a selected trace lines and decreases contrast of nodes and links of non-selected trace lines; and
a node size visualization component that first determines an ending node size of an ending node and then computes sizes of nodes earlier in time than the ending node, and then varies the sizes of the nodes earlier in time between a starting node having a smallest size and the ending node having a largest size, with each node gradually increasing in size from the starting node to the ending node to provide a static indicator of a direction over time of flow of a trend of the data items.

12. The data trends static visualization system of claim 11, further comprising a node opacity visualization component that varies opacity of nodes of a data item based on a node's position in time such that nodes of the data item vary from less opacity for nodes of the data item earlier in time to more opacity for nodes of the data item later in time to statically illustrate changes over time of the data item and indicate a direction of trend flow of the data item.

13. The data trends static visualization system of claim 11, further comprising a link opacity visualization component that varies opacity of a link of a data item between two nodes of the data item such that the link varies from less opacity for a first end of the link attached to a first node representing data that is earlier in time to more opacity for a second end of the link attached to a second node representing data that is later in time to statically illustrate changes over time of the data item and indicate a direction of trend flow of the data item.

* * * * *